Jan. 25, 1955
H. O. FANKBONER ET AL
2,700,299
VACUUM OPERATED HYDROMETER
Filed April 11, 1951
2 Sheets-Sheet 1
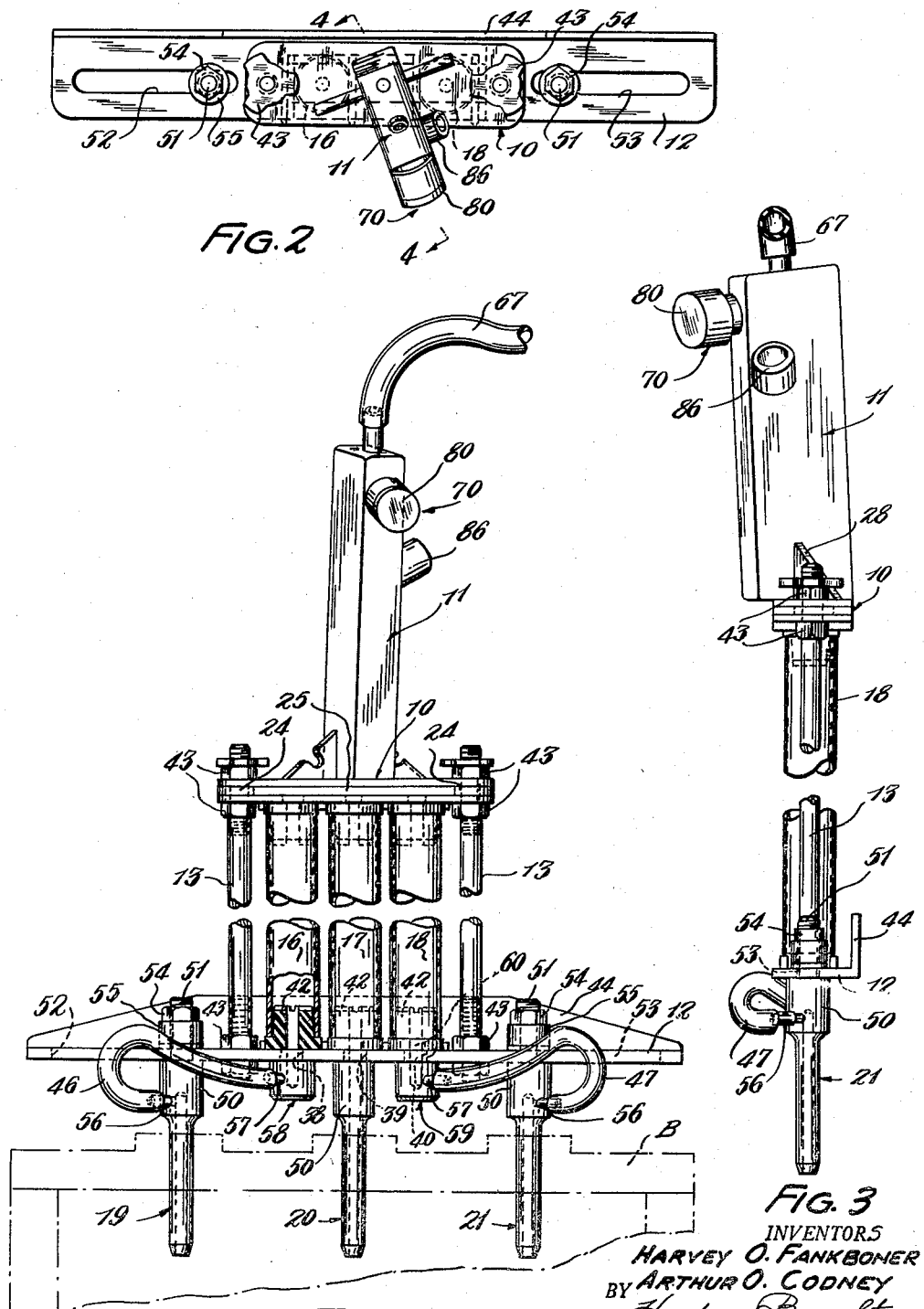
INVENTORS
HARVEY O. FANKBONER
BY ARTHUR O. CODNEY
Hudson, Boughton,
Williams, David & Hoffmann
ATTORNEYS Jan. 25, 1955     H. O. FANKBONER ET AL     2,700,299
VACUUM OPERATED HYDROMETER Filed April 11, 1951     2 Sheets-Sheet 2

INVENTORS
HARVEY O. FANKBONER
BY ARTHUR O. CODNEY
Hudson, Boughton,
Williams, David & Hoffmann.
ATTORNEYS › # United States Patent Office

2,700,299
Patented Jan. 25, 1955

2,700,299

VACUUM OPERATED HYDROMETER

Harvey O. Fankboner, Cleveland Heights, and Arthur O. Codney, Mayfield Heights, Ohio, assignors to The Electric Storage Battery Company, a corporation of New Jersey Application April 11, 1951, Serial No. 220,502

2 Claims. (Cl. 73—33)

The present invention relates to a vacuum operated hydrometer, and more particularly to a hydrometer suitable for determining the specific gravity of electrolyte in multi-cell liquid electrolyte, storage batteries.

During the manufacture of storage batteries it is the practice to check the specific gravity of the electrolyte in the battery cells by hydrometers as the batteries move past a checking point on a conveyor. Any residual electrolyte in the intake stems or nozzles of the hydrometers tends to drip therefrom onto the battery cases and the conveyor for the batteries as the hydrometer is transferred from one battery to the next, and the dropped electrolyte frequently spots the new battery cases and the accumulation thereof on the conveyor eventually corrodes or otherwise damages the conveyor to such an extent that relative frequent replacement thereof is required.

The principal object of the present invention is the provision of a new and improved hydrometer of the character referred to which has means for preventing dripping of electrolyte from the intake stem thereof following the discharge of the tested body of electrolyte from the hydrometer.

Another object of the invention is the provision of a new and improved hydrometer of the character referred to operated by a more or less constant vacuum and having means to control the connection of the hydrometer tube with the vacuum so that air is drawn into the hydrometer intake stem during the time the hydrometer is transferred from one battery to another, thereby preventing residual electrolyte in the stem from dripping therefrom following discharge of the tested body of electrolyte from the hydrometer tube.

A further object of the invention is the provision of a new and improved vacuum operated hydrometer of the character referred to which is inexpensive to manufacture and which can be easily manipulated and controlled by an operator.

A further object of the present invention is the provision of a new and improved hydrometer of the character referred to having a plurality of hydrometer tubes fixedly grouped in a frame structure and having at least one of the inlet stems or nozzles for at least one of the hydrometer tubes adjustably carried by the frame and connected to its associated tube by a flexible tubing so that the spacing of the hydrometer nozzles can be varied to align the nozzles with the cell openings of batteries having different cell opening spacings.

The invention resides in certain constructions and combinations and arrangements of parts and further objects and advantages will be apparent to those skilled in the art to which it relates from the following description of the preferred embodiment described with reference to the accompanying drawings forming a part of this specification, in which:

Fig. 1 is a front elevational view of a hydrometer embodying the invention for checking the specific gravity of the electrolyte of three-cell storage batteries;

Fig. 2 is a plan view of the hydrometer;

Fig. 3 is a side elevational view of the hydrometer;

Figure 4:
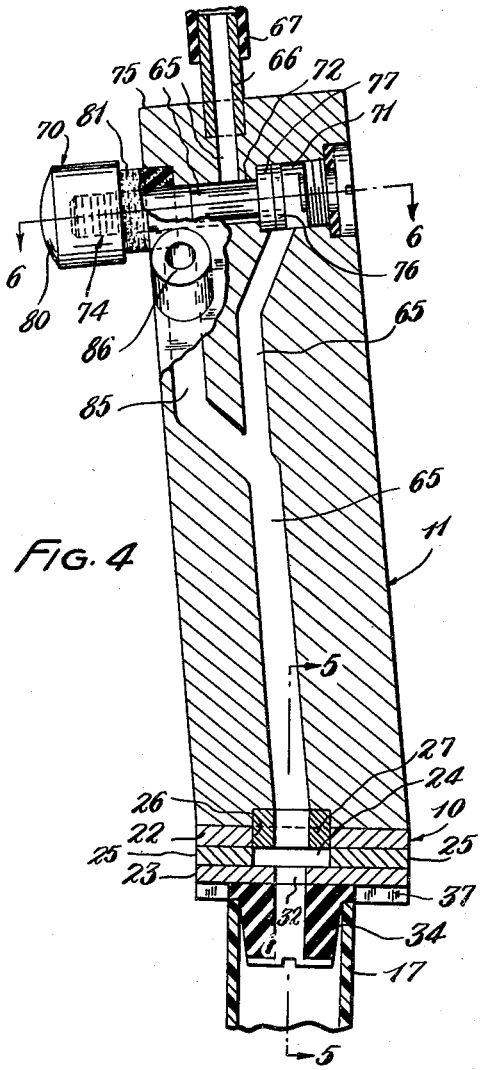
Fig. 4 is a fragmentary view partly in section of the hand grip of the hydrometer, the section being taken on line 4—4 of Fig. 2, and on a larger scale.

The invention contemplates the use of the usual type of hydrometer tube having a float therein and indicia on the float whereby the specific gravity of liquid drawn into the tube by suction through an inlet stem or nozzle can be determined according to the depth of the float in the liquid. According to the invention, the tube may be selectably connected with a vacuum and atmosphere, or air pressure at least equal to atmospheric pressure, so that a desired quantity of liquid may be drawn from a body of liquid into the hydrometer tube through its inlet stem, a reading of the specific gravity taken and the tested liquid then drained or released from the tube through the inlet stem. By selectively controlling the vacuum and atmospheric connections with the tube, air may be drawn into the inlet stem of the hydrometer when the inlet stem is transferred from one body of liquid to another, thereby preventing residual liquid from dripping from the stem.

The invention may be used in hydrometers for checking the specific gravities of different liquids, but in the preferred form shown it is embodied in an hydrometer for checking the specific gravity of electrolyte in three-cell storage batteries. The hydrometer comprises a frame structure having a manifold 10, a hand grip 11 attached to the manifold, and a cross member 12 attached to the manifold by tie rod devices 13. Glass hydrometer tubes 16, 17 and 18 are supported between the manifold 10 and cross member 12 with the upper ends of the tubes in communication with the interior of the manifold and the lower ends in communication with intake stems or nozzles 19, 20, 21 respectively. The hand grip member has an air passage therethrough, one end of which is connected with a suitable vacuum creating mechanism, not shown, and the other end of which communicates with the interior of the manifold as explained more fully hereinafter.

The manifold 10 may be of any suitable construction and material unaffected by electrolyte, and is here shown comprised of upper and lower bar-like members 22, 23 separated by end blocks 24 and two spaced strips 25 all of which are of Celluloid and cemented together to form a hollow manifold. The upper member 22 has an opening 26 therethrough in which a neck 27 on the lower end of the hand grip 11 is attached to form an airtight joint. The hand grip 11 is preferably formed of a Celluloid block which is cemented to the upper member 22 of the manifold, and gussets 28 are cemented to the grip and manifold to further secure the grip in place. The lower manifold member 23 has three openings 31, 32, 33 through which the upper ends of the hydrometer tubes 16, 17, 18 communicate with the manifold chamber.

Airtight connections are effected between the tube ends and the member 23 by rubber bushings 34 which project into the tubes and fit loosely therein and each bushing has a flange 35 against which the end edges of the tubes sealingly engage. The bushings 34 are centered on the underside of member 23 in registration with the openings 31, 32, 33 by strips 37 cemented to the underside of member 23 intermediate the openings. The tie rods 13 draw the tube ends firmly to the bushings and hold the bushings in place with sufficient pressure to provide airtight seals between the bushings and the tubes and member 23.

The cross member 12 has three openings 38, 39, 40 therein which correspond to the openings 31, 32, 33 in the member 23, and the lower ends of the tubes 16, 17, 18 are sealingly connected with the member 12 in communication with the respective openings by rubber bushings 41 which are similar to the bushings 34 and are centered on the member by strips 42 attached to the upper side of the latter member.

In assembling the hydrometer, appropriate hydrometer floats of the usual type, not shown, are placed in the hydrometer tubes before the tubes are secured between the manifold 10 and the cross member 12. The tubes are then secured between the manifold 10 and cross member 12 by drawing the manifold and cross member toward one another by the two tie rod devices 13, the rods of which are preferably formed of aluminum and have the ends thereof threaded and extended through openings in the manifold members 22, 23, 24 and the cross member 12. Nuts 43 are threaded on the rods to hold the manifold and cross member with the tubes 16, 17, 18 in longitudinal compression therebetween, as shown. Preferably, the cross member 12 is reinforced by a web 44 attached along one edge thereof.

In the preferred form of the invention, the hydrometer tubes are disposed adjacent to one another to facilitate reading the indicia on the floats therein. Since the tubes are closer to one another than the usual cell openings in storage batteries, two of the inlet stems or nozzles 19, 21 are located on cross member 12 to the outside of the respective tubes 16, 18 and the tubes are in communication therewith through flexible tubing sections 46, 47 as explained more in detail hereinafter. Preferably, the nozzles 19, 21 are adjustably positioned on the cross member 12 so that they may be simultaneously inserted into the cells of batteries having different spacings of the cell openings, one of such batteries being illustrated at B.

The center tube 17 is preferably in more or less direct communication with the inlet nozzle 20, which is preferably of Celluloid and cemented to the bottom of the cross member 12 with the bore thereof in registration with the opening 39 through the cross member. Preferably, a neck is formed on the base of the nozzle 20 which extends into opening 39 and the bore of the nozzle extends axially therethrough.

The nozzles 19, 21 are also preferably formed of Celluloid and include base portions 50 having threaded shanks 51 projecting therefrom which extend through elongated slots 52, 53 provided through the cross member 12 at the outer end portions thereof. The nozzles 19, 21 are clamped to the member 12 at any selected positions along the slots 52, 53, respectively, by nuts 54 threaded on the shanks and pressing tubular rubber springs 55 surrounding the stems against the top of the member 12, thereby drawing the bases of the nozzles to the underside of the cross member. The bores of the nozzles 19, 21 terminate short of the upper ends of the bases thereof and are each connected at their inner ends by an inwardly extending bore, and a sleeve or nipple 56 is secured in each nozzle base in registration with the inwardly extending bore, and one end of the respective tubings 46, 47 are connected with the sleeves.

The other ends of the tubings 46, 47 are connected to nipples 57 of elbow fittings 58, 59 which are preferably formed of Celluloid and are cemented to the underside of cross member 12. The fittings 58, 59 each has a right angle passage therethrough communicating at one end with the nipples 57 thereof and extending through a neck 60 at the upper end of the fitting, which neck projects into the openings 38, 40, as the case may be. By the arrangement disclosed, the nozzles 20, 22 can be adjustably positioned, within limits, along the cross member 12 so that the nozzles can all be aligned with and inserted simultaneously in the respective cells of a three-cell storage battery and the electrolyte from each cell drawn into tubes 16, 17, 18 simultaneously to expedite the checking operation.

As mentioned hereinbefore, the chamber of manifold member 10 is connected with a suitable vacuum creating device, not shown, and to atmosphere through a passage 65 formed through the hand grip 11. The passage 65 extends through the neck 27 of the grip and upwardly through the grip to a sleeve 66 extending from the top thereof to which sleeve a flexible tube 67 is attached thereto which leads to the vacuum creating device. The vacuum creating device may be of any well known form which produces a relatively constant sub-atmospheric pressure capable of drawing electrolyte well up into the tubes 16, 17, 18.

Figure 6:
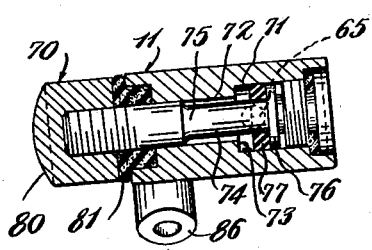
Fig. 6 is a sectional view taken on line 6—6 of Fig. 4.
Figure 5:
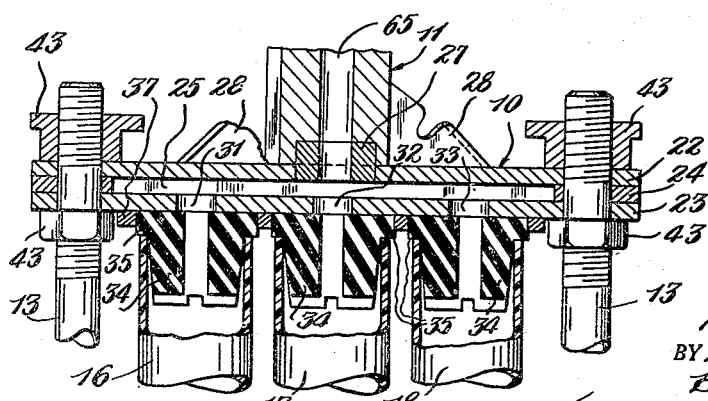
Fig. 5 is a fragmentary sectional view taken substantially on line 5—5 of Fig. 4.

The connection of passage 65 with the tube 67 is controlled by a normally closed valve 70 located in the upper portion of the passage. In the form shown, the passage 65 includes a transverse bore 71 having a reduced diameter portion 72 which forms a valve seat 73. A valve stem 74 projects through the bore 71, and is reduced in diameter at 75 to permit the passage of air therearound. The inner end of the valve stem has an enlarged head or piston 76 which closely fits the walls of the transverse bore 71 and carries a resilient valve washer 77 which is moved to and from the valve seat 73 as the stem is reciprocated. The outer end of the valve stem projects from the hand grip 11 and has an actuating button 80 attached thereto, and a rubber spring washer 81 is interposed between the button and hand grip to normally move the valve stem to close the valve. The valve is opened by pressing the button 80 toward the hand grip, as shown in Fig. 6.

Passage 65 includes a branch 85 which extends from the passage proper, preferably at a point intermediate the valve 70 and the manifold 10, to the atmosphere through a boss or port formation 86 formed on the exterior of the hand grip 11. The port 86 is preferably located so that the operator of the hydrometer can close the opening thereof with one finger while holding the hand grip 11 and while operating the valve button 80 with another finger. It will be seen that by closing the port 86 and opening valve 70, the suction applied through the passage 65 and manifold 10 causes air or liquid to be drawn into the tubes 16, 17, 18 through the nozzles 19, 20, 21 and by then closing the valve 70 liquid may be retained in the tubes. By opening the port 86, the vacuum in the tubes 16, 17, 18 and manifold 10 is broken and liquid may then flow from the tubes through the nozzles.

In operating the hydrometer, the valve button 80 is released and the passage 85 at port 86 may be either open or closed while the inlet nozzles 19, 20, 21 are inserted into the cell openings of a storage battery. Port 86 is then closed by the operator's finger and the valve operating button 80 is also depressed which connects the tubes 16, 17, 18 with the vacuum creating device and causes electrolyte to be drawn into the tubes, and when the hydrometer floats are buoyed, the valve button 80 is released which closes off the vacuum and the electrolyte is held in the tubes while readings are taken. Following the specific gravity readings, the port 86 is uncovered which opens passage 65, manifold 10 and the upper ends of the tubes to atmospheric pressure thereby allowing the electrolyte to flow by gravity back into the battery cells. After the nozzles 19, 20, 21 are removed from the electrolyte but prior to the removal of the nozzles from the cell openings, port 86 is reclosed and the valve button 80 is depressed to open the vacuum valve 70, which causes streams of air to be drawn upwardly through the nozzles to block the tendency of residual electrolyte on the walls of the nozzle bores from dropping from the nozzle ends. The hydrometer nozzles may then be transferred to another battery without dropping electrolyte, thereby eliminating the hazards of staining battery casings and damaging the battery conveyors due to dripping electrolyte, as is encountered when prior known hydrometers are employed.

As an alternative construction, the valve 70 could be made normally urged to its open position and closed by depressing the operating button. In this event, the operating button need only be pressed to hold the liquid in the hydrometer tubes to obtain the hydrometer readings.

It will be seen that by our invention we have provided a new and improved hydrometer by which the specific gravity of liquids can be quickly and easily determined without losing drops of residual liquids from the hydrometer following the checking operation. It is to be understood that while we have shown a hydrometer for checking electrolyte in the cells of a three-cell storage battery, the hydrometer could be made with any desired member of hydrometer tubes and inlet nozzles. Furthermore, the hydrometer could be used to determine the specific gravity of liquids other than electrolyte.

While the preferred form of the invention has been described in considerable detail, it will be apparent that the invention is not limited to the constructions shown or the particular materials employed therein and it is our intention to cover hereby all adaptations, modifications and changes therein which come within the practice of those skilled in the art to which the invention relates and the scope of the appended claims.

Having thus described our invention, we claim:

1. A hydrometer comprising a handle, a frame structure attached at one end to said handle and including at the opposite end a transverse plate, a plurality of hydrometer tubes supported in fixed relation on said structure, an individual inlet nozzle for each of said tubes supported by said frame and adapted to be received by a battery cell, means connecting each of said nozzles to the inlet end of its corresponding tube, and means for securing at least one of said nozzles to said plate in one of a plurality of positions with respect to the other nozzles, the means for connecting the nozzle supported by the last said means to its corresponding tube comprising a flexible conduit.

2. A hydrometer comprising a handle, a frame structure attached at one end to said handle and including at the opposite end a plate having a slot therein, a plurality of hydrometer tubes positioned side by side in said frame and supported by said plate, a nozzle for each of said tubes supported by said plate and adapted to be received in a battery cell, means for connecting each of said nozzles to its corresponding tube including a flexible conduit for connecting at least one of said nozzles to its corresponding tube, and means for adjustably mounting said one nozzle comprising clamping means extending through said slot and operative to clamp said one nozzle.

References Cited in the file of this patent

UNITED STATES PATENTS

| | | |
|---|---|---|
| 1,448,142 | Martin | Mar. 13, 1923 |
| 1,612,093 | Bowerman | Dec. 28, 1926 |
| 1,852,118 | Kahn | Apr. 5, 1932 |
| 1,992,813 | Codney | Feb. 26, 1935 |
| 2,031,025 | Altmayer | Feb. 18, 1936 |
| 2,519,056 | Lang | Aug. 15, 1950 |